(No Model.)
J. L. ATKINSON & L. BRANCHAUD.
REMOVABLE ICE TIRE FOR BICYCLES.
No. 576,420. Patented Feb. 2, 1897.
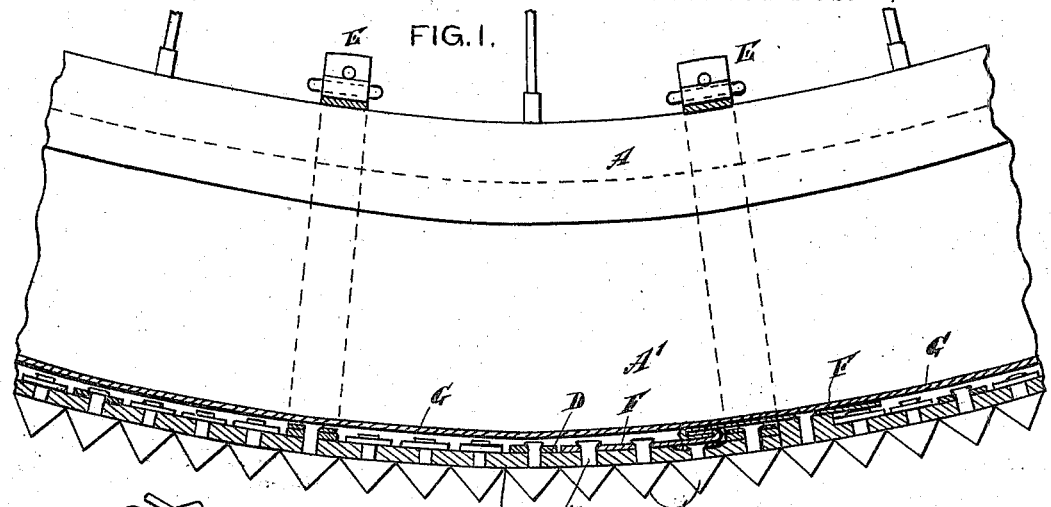
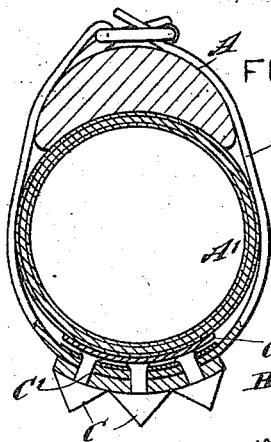
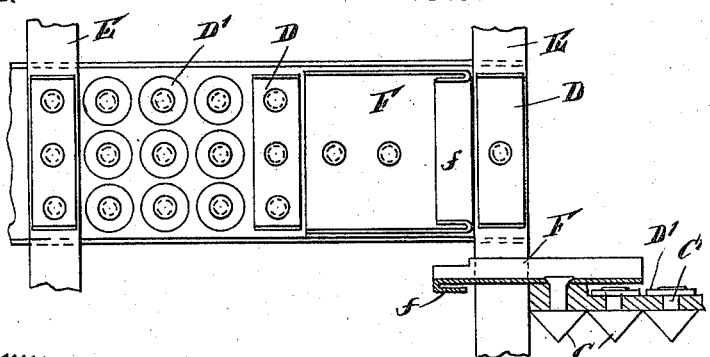
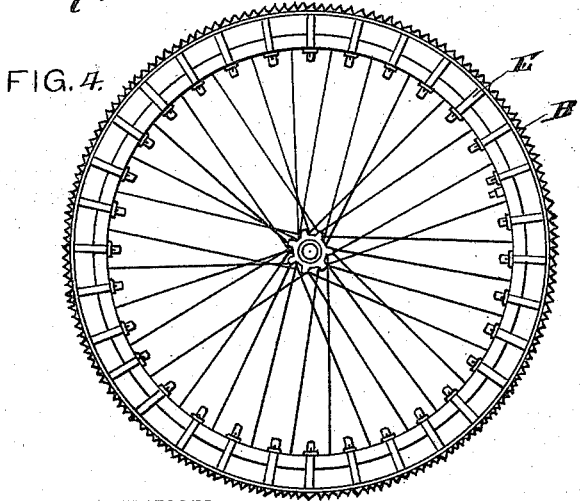
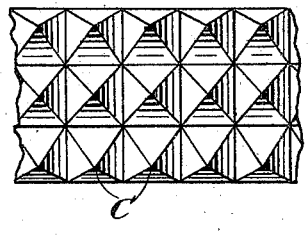
WITNESSES:
Donn Twitchell
H. L. Reynolds.
INVENTORS:
J. L. Atkinson,
L. Branchaud.
BY
ATTORNEYS.

UNITED STATES PATENT OFFICE.

JEFFERSON LEWIS ATKINSON AND LEONARD BRANCHAUD, OF POTSDAM, NEW YORK.

REMOVABLE ICE-TIRE FOR BICYCLES.

SPECIFICATION forming part of Letters Patent No. 576,420, dated February 2, 1897.

Application filed October 14, 1896. Serial No. 608,793. (No model.)

*To all whom it may concern:*

Be it known that we, JEFFERSON LEWIS ATKINSON and LEONARD BRANCHAUD, of Potsdam, in the county of St. Lawrence and State of New York, have invented a new and Improved Removable Ice-Tire for Bicycles, of which the following is a full, clear, and exact description.

Our invention relates to an improvement in removable ice-tires or devices intended to prevent slipping of a bicycle upon ice or other slippery surfaces.

Reference is to be had to the accompanying drawings, forming a part of this specification, in which similar characters of reference indicate corresponding parts in all the figures.

Figure 1 is a longitudinal section through a tire with our device applied thereto. Fig. 2 is a cross-section of the same. Fig. 3 is a plan view of our device with the ends thereof in position for locking. Fig. 4 is a side elevation of a wheel with our device applied thereto, and Fig. 5 is a plan view of the outer surface of a short section of the tire.

The object of our invention is to produce a tire which may be quickly applied to or removed from a bicycle-wheel and which will prevent its slipping upon the ice or other slippery surfaces.

In the drawings, A represents the rim of a bicycle-wheel, and A' the pneumatic tube thereon. Our device is applied thereto in the form of a narrow strip of leather, forming a tire which is to be fastened upon the tread of the wheel and secured thereto, so that it will not slip or turn. The outer surface of this tire is provided with a series of spurs or sharp points which will engage the ice and prevent slipping. This leather belt is represented in the drawings by B and is made of such a width as to cover the tread only of the tire. It is made of such a length that when the ends are united it will form a circle slightly less in circumference than the outer surface of the bicycle-tire. This belt or leather band is provided with a series of sharp spurs C, and the spurs are provided with a shank C', which passes through a hole in the leather and through a washer and is then riveted in place. Three rows of these are shown in Figs. 3 and 5. The spurs shown in the drawings have points of a pyramidal shape. The particular shape of these points is immaterial. They may be made of another shape, if thought desirable. The outer surface of the belt is entirely covered by these spurs or points. At certain distances a washer composed of a narrow strip of sheet metal D is provided, which receives the shanks of all of the spurs in that row. These washers D are to be curved so as to fit the outer curve of the bicycle-tire. In the drawings we have shown these washers as being applied to every fourth row. They may be applied oftener or less frequently, as desired. At certain distances, preferably greater than those for the washers, leather straps E are also fastened to the under side of the belt and are long enough to reach around the bicycle rim and tire, fastening upon the inner side thereof, as indicated in Figs. 1 and 2. The washers upon the inner surface of the ordinary spurs are shown at D', Fig. 3.

At the ends of the belt a locking device is attached. (Illustrated in Fig. 3.) This consists of metal plates F, fixed on the extreme ends of the belt. The outer ends of these plates are bent back upon themselves, so as to form a recess or hook *f*. One of these plates is bent inwardly and the other outwardly, so that when the two are placed together they will form a lock. This lock may be applied by sliding the two pieces longitudinally into place or by putting their edges together and sliding them in place in that manner. One end of the belt in Fig. 3 is shown in plan view and the other in edge sectional view. One plate F has the lock *f* bent outwardly, while the other plate F has the same portion bent inwardly.

In applying our device the tire should be deflated until it may be pressed toward the rim. The belt is placed upon the rim and the ends locked together. This may be readily done, as the tire is deflated and thus of less diameter than when in working order. The belts E are then buckled about the tire and rim. The tire is then inflated, which enlarges the diameter of the same and presses it against the inner surface of the belt, which, in connection with the straps E, thoroughly secures the same in place.

To remove the belt, the tire is first deflated, so as to release the tension upon the belt, the straps are unbuckled, and the end lock broken. To put the belt in place or to remove the same will take but a very short time. The belt need weigh but a small amount and will be very easy to carry and quick to apply or remove. It will render the use of a bicycle safe upon ice or other slippery surfaces. To prevent the inner surfaces of the rivets from wearing the rubber tire, we provide a strip G, of canvas or other similar material, which is placed between the belt and the tire. This will be held in place by the pressure between the tire and the belt.

Having thus described our invention, we claim as new and desire to secure by Letters Patent—

1. A removable ice-tire for bicycles, consisting of a flexible belt of less length than the circumference of the inflated tire, means for joining the ends of the belt together, metal spikes or spurs fixed to the belt, non-flexible bars or plates attached to the under side of the belt and bent to the curve of the tire-section, and straps attached at frequent intervals to the belt and passing about the tire and rim, substantially as described.

2. A removable ice-tire for bicycles, consisting of a flexible belt having a metal plate on each end, crimped or turned back upon itself and forming a lock, the same being of curved cross-section to fit the tire and of the full width of the said belt, said belt being of less length than the inflated tire, metal spikes or spurs fixed to and projecting from the belt, metal plates attached at intervals to the under side of the belt and bent to the curve of the tire-section, and straps attached at frequent intervals to the belt and passing about the tire and rim, substantially as described.

JEFFERSON LEWIS ATKINSON.
LEONARD BRANCHAUD.

Witnesses:
J. L. BROWN,
J. C. CRAPSER.